United States Patent [19]

Woeste et al.

[11] Patent Number: 5,622,079
[45] Date of Patent: Apr. 22, 1997

[54] SELECTING DEVICE FOR AN AUTOMATIC TRANSMISSION OF A MOTOR VEHICLE

[75] Inventors: Norbert Woeste, Munich; Josef Neuner, Raubling, both of Germany

[73] Assignee: Bayerische Motoren Werke AG, Munich, Germany

[21] Appl. No.: 506,165

[22] Filed: Jul. 24, 1995

[30] Foreign Application Priority Data

Jun. 8, 1995 [DE] Germany ............... 44 26 207.8

[51] Int. Cl.⁶ ..................... B60K 20/02; F16H 59/04
[52] U.S. Cl. ................. 74/335; 74/473 R; 74/475
[58] Field of Search ................. 74/335, 473 R, 74/475

[56] References Cited

U.S. PATENT DOCUMENTS

| 4,987,792 | 1/1991 | Mueller et al. | 74/473 R |
| 5,243,871 | 9/1993 | Weiten | 74/473 R |

FOREIGN PATENT DOCUMENTS

| 0413116A1 | 2/1991 | European Pat. Off. |
| 3613856A1 | 12/1987 | Germany. |
| 3717675A1 | 12/1988 | Germany. |
| 3807881A1 | 9/1989 | Germany. |
| 4029330A1 | 3/1992 | Germany. |
| 62-34214 | 2/1987 | Japan. |

Primary Examiner—Charles A. Marmor
Assistant Examiner—Troy Grabow
Attorney, Agent, or Firm—Evenson McKeown Edwards & Lenahan, PLLC

[57] ABSTRACT

A selecting device for an automatic transmission of a motor vehicle includes a selector lever which can be swivelled back and forth between two different shifting channels. One shifting channel is for the step-by-step manual shifting of the automatic transmission. The other shifting channel facilitates the automatic operation of the transmission. The selector lever is pivotally mounted for movement in the two shifting channels about a first shaft axis and for movement between the shifting channels about a second shaft axis. The second shaft axis extends along a pivot shaft which is fixedly disposed in a vehicle frame. The first and second shaft axes are congruent when the selector lever is in the shifting channel for automatic operation. Shifting and interlocking devices are integrated in the selecting device.

13 Claims, 5 Drawing Sheets 5,622,079

SELECTING DEVICE FOR AN AUTOMATIC TRANSMISSION OF A MOTOR VEHICLE

BACKGROUND AND SUMMARY OF THE INVENTION

This invention relates to a selecting device for an automatic transmission of a motor vehicle which is selectively operable in an automatic operation mode and a manual step-by-step grove.

It is known to design an automatic transmission and its selecting device in such a manner that, by means of the selecting device, the driver is capable of deciding in favor of a step-by-step shifting operation or an automatic driving position system.

In the case of the automatic driving position system, the operating range of the automatic transmission is divided into various, manually preselectable operating positions which are called driving positions. The term "driving positions", as used here, comprises all operating positions of an automatic transmission, therefore also the parking or neutral position.

In the step-by-step shifting operation, the automatic transmission is manually shifted by the driver. By swivelling the selector lever from a center position, he can upshift or downshift one gear respectively, depending on the direction into which he moves the selector lever. After each shifting operation, the selector lever moves back into its center position.

Such a selecting device is described in European Patent Application EO-0 413 116 A1. It has the disadvantage that it has a very complicated construction and is large in size.

Since the mounting space for the selecting device is limited in the motor vehicle, this selecting device should be as compact and small as possible.

It is therefore an object of the invention to design a selecting device for an automatic transmission of a motor vehicle such that it is constructed of as few parts as possible, and has a compact and small construction.

According to the invention, this object is achieved by providing a selecting device for an automatic transmission of a motor vehicle comprising: Selecting device for an automatic transmission of a motor vehicle which is selectively operable in an automatic operation mode and a manual step-by-step mode, comprising:

a vehicle fixed frame, a manually movable selector lever, a first shifting channel extending in a longitudinal direction and serving to guide movement of the selector lever between driving positions P,R,N,D in an automatic operation mode of the transmission, second shifting channel extending parallel to the first shifting channel and serving to guide movement of the selector lever in a manual step-by-step operation mode of the transmission, a first shaft supporting the selector lever for pivotal movement between respective operating positions in the first and second shifting channels and a second shaft 4 supporting the selector lever for pivotal movement between the first and second shifting channels, wherein said second shaft is disposed in a fixed location in the vehicle fixed frame.

According to the invention, the shaft of the selector lever, which is disposed on a vehicle-fixed frame in a cardanically movable manner by way of two shafts, is fixed to the vehicle-fixed frame and extends in the longitudinal direction of the vehicle and permits the swivel movement of the selector lever in the transverse direction of the vehicle.

This has the advantage that this second shaft, about which the selector lever can be swivelled in the transverse direction of the vehicle, can be arranged in the vehicle-fixed frame at such a level that, for a sufficient transverse movement of the shift lever, this shift lever may be selected to be very short. Likewise, the other components of this selecting device can simply be arranged around this vehicle-fixed bearing of the selector lever in a space-saving and compact manner. In addition, the components may be designed and arranged such that they take over several functions.

For a short, space-saving selector lever, it is also important to carry out the vehicle-fixed bearing by way of the second shaft at least at the same level of a first shaft about which the selector lever is disposed to be swivelled in the longitudinal direction of the vehicle. A preferred embodiment of the invention therefore provides that both shafts of the selector lever about which the selector lever is disposed to be cardanically swivellable and fixed to the vehicle be placed in the same horizontal plane. This results in a selecting device of a particularly compact construction.

Additional advantageous embodiments of the invention optimize this invention with respect to the space requirement and the number of components. Also, a still simpler construction is achieved which lowers the manufacturing and mounting costs of the selecting device and ensures its reliable operation.

If the selecting device is constructed such that the second shaft is formed with a shifting gate on which the selector lever is disposed by way of the first shaft, this shifting gate can be swivelled along with the selector lever when the selector lever is swivelled from one shifting channel into the next. In this case, the detent devices for fixing the shifting channels may simply be constructed on the shifting gate and the vehicle-fixed frame. Also provided in a simple manner is the stop face which limits the longitudinal movement of the selector lever at the point at which its transverse movement can take place. Between the selector lever, the shifting gate and a control lever which can be swivelled in the longitudinal direction and whose shaft is advantageously congruent with the first shaft of the selector lever (when in the automatic mode shifting channel), different engagement part surfaces engage with one another in a form-locking manner for controlling the step-by-step shifting system or the driving position selecting device. All locking and control functions for the selector lever are controlled by effective engagement part surfaces on the selector lever, the shifting gate and the control lever which permits the very simple construction of the selecting device.

Other objects, advantages and novel features of the present invention will become apparent from the following detailed description of the invention when considered in conjunction with he accompanying drawings.

DETAILED DESCRIPTION OF THE INVENTION

Figure 1A:
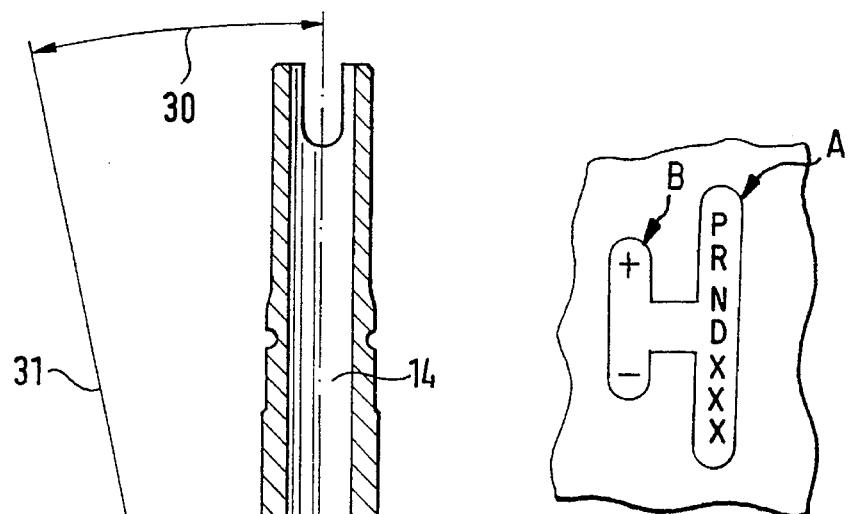
FIG. 1A is a schematic view of the shifting channel configuration of the selecting device of FIG. 1.
Figure 1:
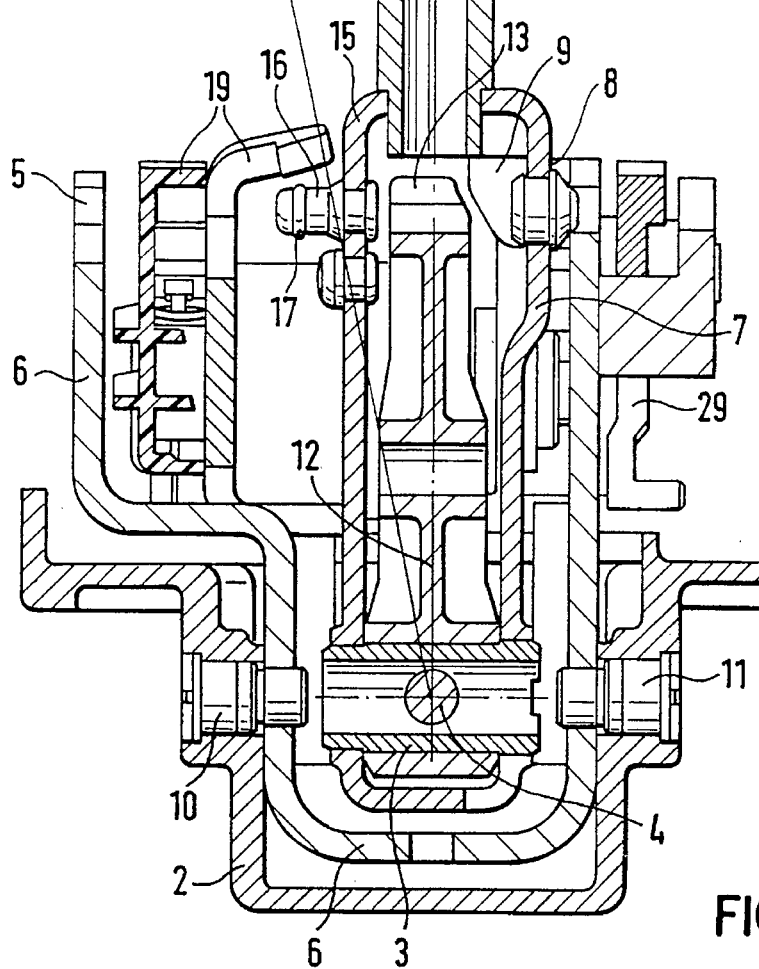
FIG. 1 is a cross-sectional view of a selecting device constructed according to a preferred embodiment of the invention, showing a selector lever which can be swivelled in two shifting channels.

According to FIG. 1, a selector lever 1 of a selecting device for an automatic transmission of a motor vehicle, which is not shown, is disposed in a cardanically movable manner in a vehicle-fixed frame 2 by way of a first shaft 3 and a second shaft 4. The first shaft 3 extends in the transverse direction of the vehicle and permits a movement of the selector lever 1 in the longitudinal direction of the vehicle for preselecting the individual driving positions in automatic shifting or shifting of the gears in step-by-step shifting. The second shaft 4 extends in the longitudinal direction of the vehicle and therefore forms the swivelling axis of the selector lever 1 about which the latter may be swivelled in the transverse direction of the vehicle from a shifting channel A for preselecting the driving positions into a shifting channel B for the step-by-step shifting.

FIG. 1A schematically depicts these shifting channels A and B.

The swivel angle 30 of the selector lever 1 is indicated by the additionally entered center line 31 for the position in which it is swivelled into the step-by-step shifting channel B. In FIG. 1, the selector lever 1 is situated in the shifting channel A for preselecting the driving positions. In this shifting channel A, by means of the swivel movement of the selector lever 1 about the first shaft 3, at least the individual driving positions P, R, N and D can be engaged successively. By way of a selecting cable, which is not shown and which is pivotally connected on a bore 5 of a control lever 6, the movement of the selector lever 1 in the driving position selecting channel A is transmitted to the automatic transmission. For this purpose, the selector lever 1 is selectively form-lockingiy connected with the control lever 6. This connection is made by swivelling of the selector lever 1 from the step-by-step shifting channel B into the driving position selecting channel A. In this case, a leg 7 with abutment part surfaces 8 constructed on it swivels into abutment engagement part surfaces 9 of the control lever 6 which is constructed to be U-shaped at this point. So that the control lever 6 moves with the selector lever 1 without any sliding movement between the surfaces 8 and the surfaces 9, the control lever 6 is swivellably fixed in the frame 2 by way of a shaft consisting of two shaft halves 10, 11 whose axis of rotation is congruent with the first shaft 3 of the selector lever 1 when the selector lever 1 is in shifting channel A.

The control lever 6 reaches around the lower part of the selector lever 1 in a U-shaped manner so that, despite the congruent swivel shafts in the longitudinal direction of the vehicle of the selector lever 1 and the control lever 6, the selector lever 1 can be swivelled about the second shaft 4 inside the upwardly open U-shaped space defined by the control lever 6. In this case, the first shaft 3 and the selector lever 1 as well as a shifting gate 12 around which the lower O-shaped part of the selector lever 1 reaches, are rotated about the swivel angle. The axis of rotation is the second shaft 4 which is situated in the same plane as the first shaft 3 and is formed with the shifting gate 12. The first shaft 3 is situated in the shifting gate 12. Furthermore, the shifting gate 12, which extends upwards from its bearing in the frame 2, has detents 13 on its upper surface which interact with a locking device which is not shown and is constructed at the selector lever. The locking device extends through a bore 14 of the selector lever 1 and may, for example, be operated by means of a key on the selector lever grip which is not shown.

For the shifting functions in the step-by-step shifting channel B, the selector lever 1 has, on another leg 15 of its O-shaped lower section, an extension 16 with effective abutment surfaces 17 which engage in a form-locking manner, by means of the swivelling of the selector lever 1, with corresponding abutment surfaces 18 (FIG. 2) of a step-by-step shifting system 19. Swivelled into the step-by-step shifting channel B, the selector lever 1 can be moved in parallel to the driving position selecting channel about its first shaft 3 in the longitudinal direction of the vehicle from its center position to the front and rear. The swivel movement takes place against the force of a spring 5, shown schematically in FIG. 1A and which is housed in the step-by-step shifting device 19. This springs always restores the selector lever 1 into the center position.

In the step-by-step shifting device 19, a sensor device is also situated which is not shown and which transmits the shifting signals from the movements of the selector lever 1 to a transmission control apparatus which is not shown and which processes them. In the case of a movement of the selector lever 1 in the driving direction, the next higher gear is shifted; in the case of a movement of the selector lever 1 against the driving direction, the next lower gear is engaged.

Figure 2:
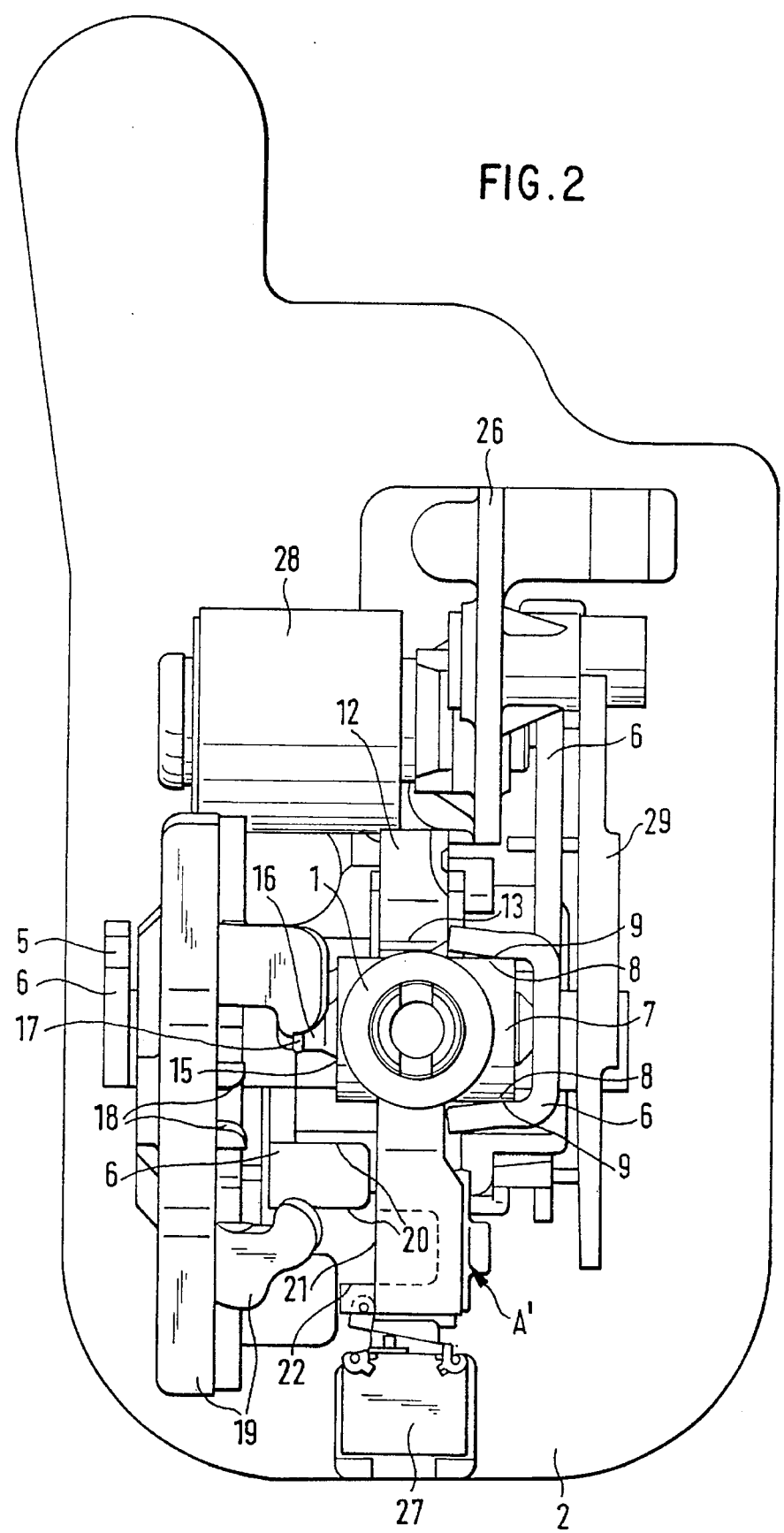
FIG. 2 is a top view of the selecting device of FIG. 1.

As illustrated in FIG. 2, the selector lever 1, which is in the driving position selecting channel, can be swivelled only in a single position in this channel into the step-by-step shifting channel; specifically when it is ensured that its first effective surfaces 17 can engage with the corresponding effective surfaces 18 of the step-by-step shifting system 19. Since, in the inoperative position, the step-by-step shifting system 19 is always in the same center position, before the selector lever 1 is swivelled into the step-by-step shifting channel, it must be brought into the corresponding position in the driving position selecting channel. If it is not in this position, it is prevented that the selector lever 1 can be swivelled into the step-by-step shifting position. For this purpose, fourth effective surfaces 20 are mounted on the control lever 6 which, when the selector lever 1 is swivelled into the step-by-step shifting channel, form a form-locking connection with a recess 21 (shown by a broken line) in the shifting gate 12. This recess 21 permits, on the one hand, the swivelling of the shifting gate 12 into the step-by-step shifting channel and, on the other hand, blocks the control lever 6 when the selector lever 1 is in the step-by-step shifting channel. In order to find the position of the selector lever 1 more easily from which a swivelling is possible into the step-by-step shifting channel, the shifting gate 12 has a stop face 22 which limits the longitudinal movement of the selector lever 1 in the driving position preselecting channel by the interaction with the effective surfaces 20 of the control lever 6 at the point at which the back-and-forth shifting between the shifting channels can be carried out.

At a point which in FIG. 2 is indicted by an arrow with the reference symbol A', a detent device, which is not visible in this view, is situated between the shifting gate 12 and the frame 2 and determines the positions of the two shifting channels.

Figure 3:
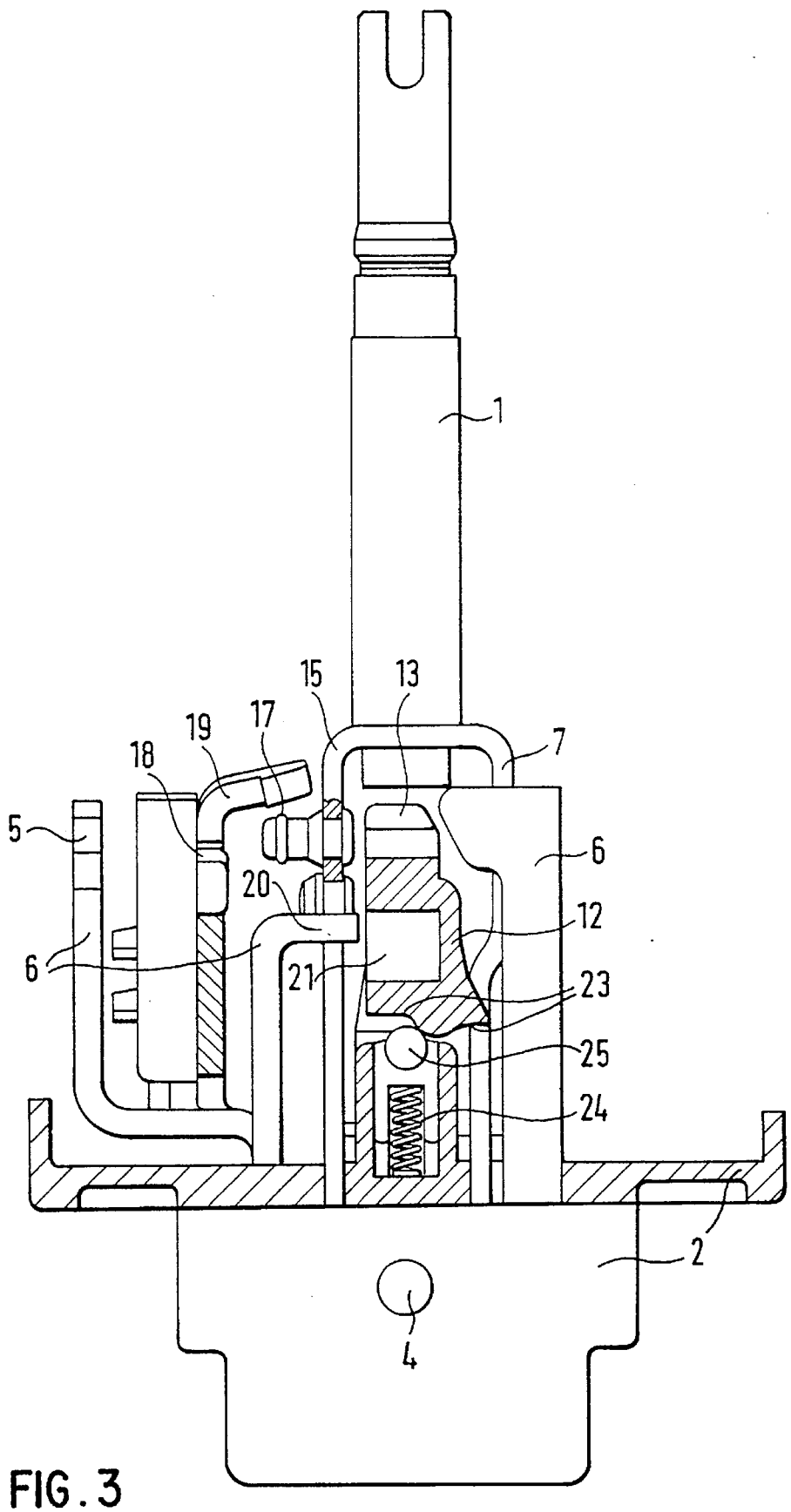
FIG. 3 is a partial sectional schematic view of the selection device of FIG. 1, showing detent devices for fixing the shifting channels constructed on the shifting gate and the frame.
Figure 4:
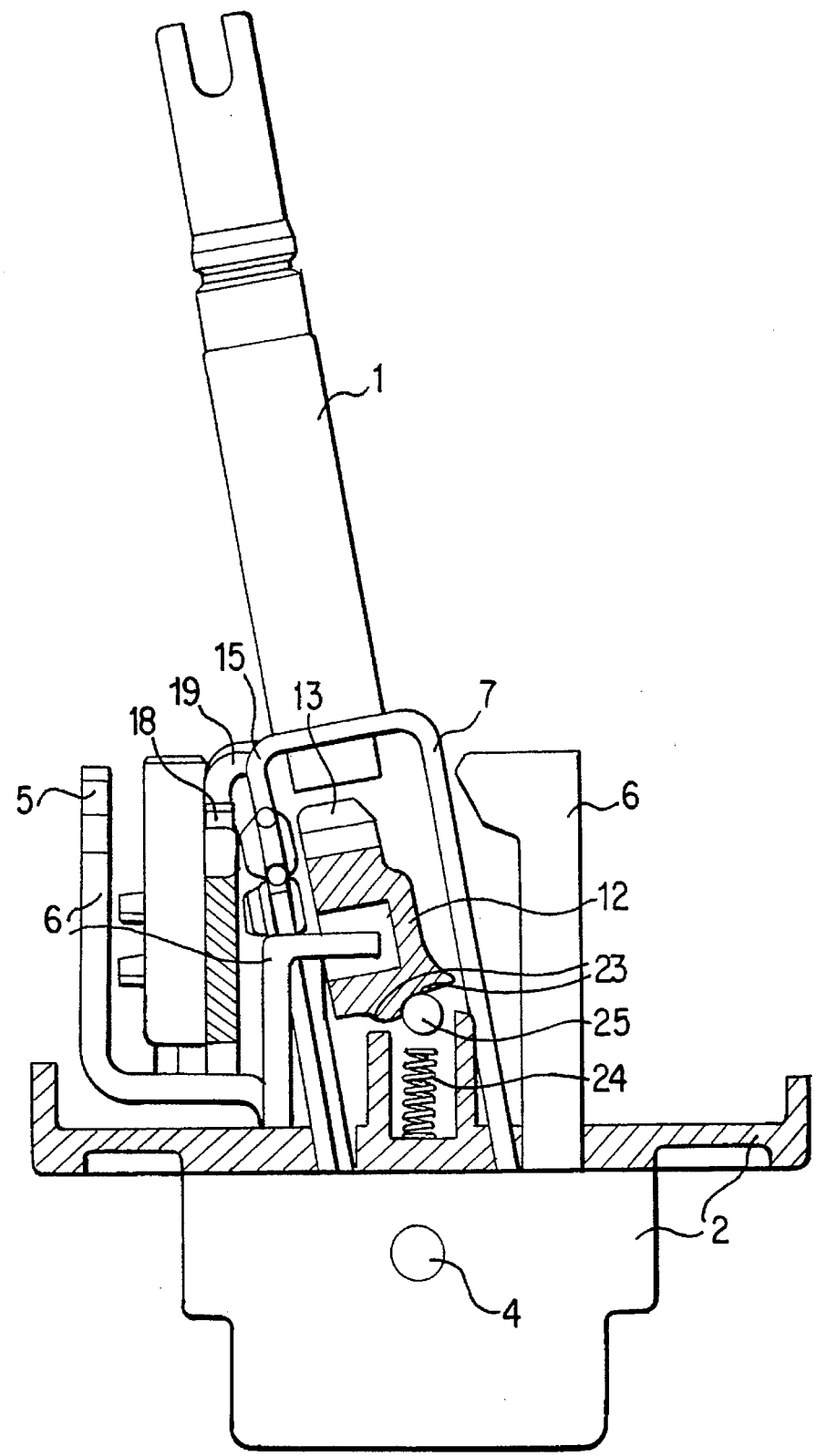
FIG. 4 is a view similar to FIG. 3, showing the selector lever in the channel for step-by-step shifting.
Figure 5:
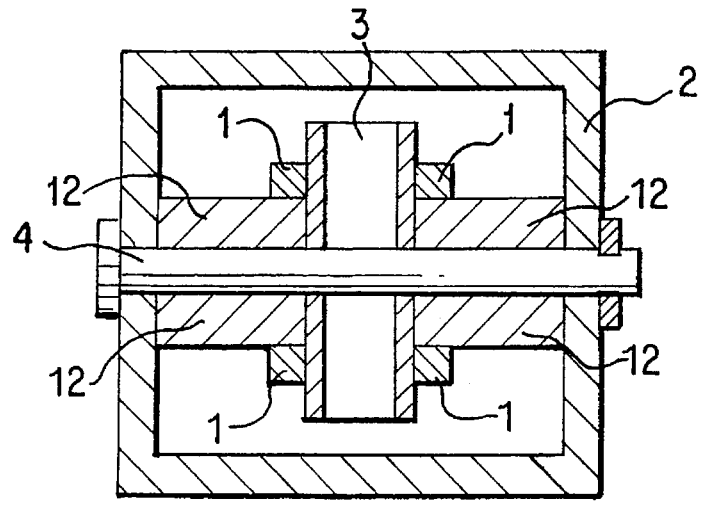
FIG. 5 is a sectional schematic view through the plane of the selector lever pivot shafts of the selection device of FIG. 1.
Figure 6:
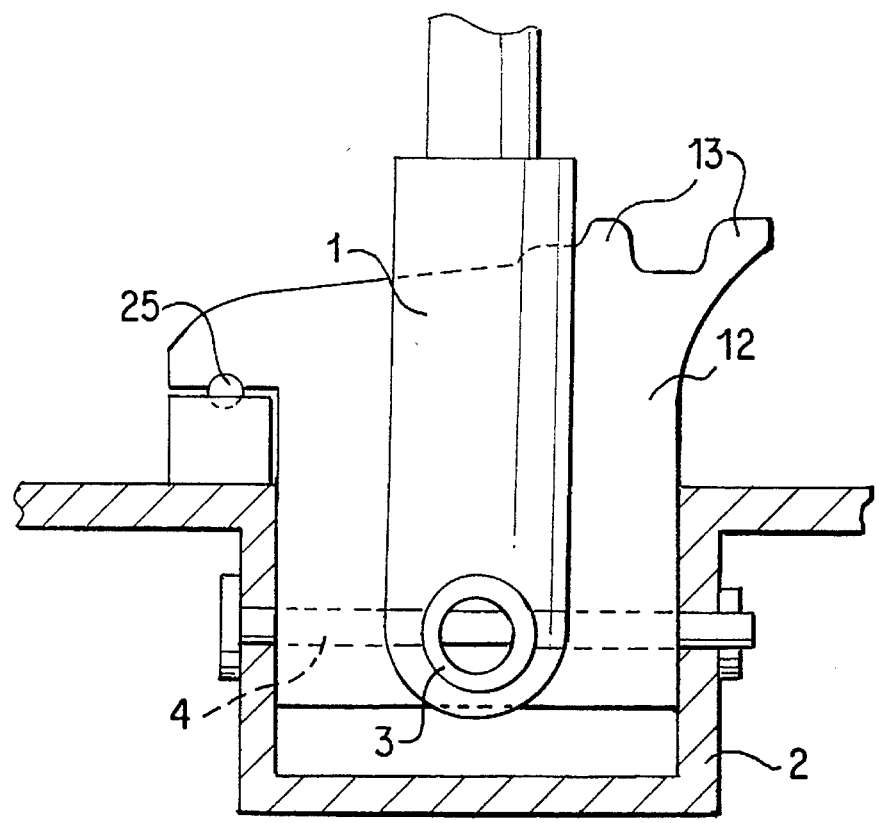
FIG. 6 is a part sectional schematic view showing the operation of the shifting gaze of the selecting device of FIGS. 1–5.

FIG. 3 illustrates that the shifting gate 12 has detent devices which engage under spring loading with corresponding detent devices on the frame 2 and determine the position of the selector lever 1 for each shifting channel in the transverse direction of the vehicle. The detent devices on the shifting game 12 are recesses 23 into which an element 25, which is loaded by a spring 24 and is movably disposed on the frame, engages by means of its cylindrical surface as a corresponding detent device.

FIG. 2 also shows other elements of the selecting device, specifically an electric position indicator 27 which interacts with the shifting gate 12, for determining the shifting channel in which the selector lever 1 is situated. FIG. 2 also shows a solenoid 28 of a shift locking device which prevents the shifting of the selector lever 1 in the driving position selecting channel by the form-locking interaction with the control lever 6 when, for example, the foot brake of the vehicle is not operated but the selector lever 1 is to be moved out of position P.

By way of deflecting devices, which are not shown, the lever 29 of an interlocking device will then block the withdrawing of the ignition key when driving position P is not engaged. The integration of the shift locking and interlocking devices on a bearing block 26 into the selecting device is therefore implemented in a very simple manner and nevertheless permits a compact construction of the selecting device.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Selecting device for an automatic transmission of a motor vehicle which is selectively operable in an automatic operation mode and a manual step-by-step mode, comprising:

a vehicle fixed frame, a manually movable selector lever, a first shifting channel extending in a longitudinal direction and serving to guide movement of the selector lever between driving positions in an automatic operation mode of the transmission, a second shifting channel extending parallel to the first shifting channel and serving to guide movement of the selector lever in a manual step-by-step operation mode of the transmission, a first shaft supporting the selector lever for pivotal movement between respective operating positions in the first and second shifting channels and a second shaft supporting the selector lever for pivotal movement between the first and second shifting channels, wherein said second shaft is disposed in a fixed location in the vehicle fixed frame, and wherein a restoring spring is provided to return the selector lever to a center neutral position in the second shifting channel, which center neutral position is disposed to facilitate subsequent movement of the selector lever from the second shifting channel to the first shifting channel.

2. Selecting device for an automatic transmission of a motor vehicle which is selectively operable in an automatic operation mode and a manual step-by-step mode, comprising:

a vehicle fixed frame, a manually movable selector lever, a first shifting channel extending in a longitudinal direction and serving to guide movement of the selector lever between driving positions in an automatic operation mode of the transmission, a second shifting channel extending parallel to the first shifting channel and serving to guide movement of the selector lever in a manual step-by-step operation mode of the transmission, a first shaft supporting the selector lever for pivotal movement between respective operating positions in the first and second shifting channels and a second shaft supporting the selector lever for pivotal movement between the first and second shifting channels, wherein said second shaft is disposed in a fixed location in the vehicle fixed frame, and wherein the first and the second shaft are situated in the same plane.

3. Selecting device according to claim 1, wherein the second shaft is connected with a shifting gate on which the selector lever is disposed by way of the first shaft.

4. Selective device for an automatic transmission of a motor vehicle which is selectively operable in an automatic operation mode and a manual step-by-step mode, comprising:

a vehicle fixed frame, a manually movable selector lever, a first shifting channel extending in a longitudinal direction and serving to guide movement of the selector lever between driving positions in an automatic operation mode of the transmission, a second shifting channel extending parallel to the first shifting channel and serving to guide movement of the selector lever in a manual step-by-step operation mode of the transmission, a first shaft supporting the selector lever for pivotal movement between respective operating positions in the first and second shifting channels and a second shaft supporting the selector lever for pivotal movement between the first and second shifting channels, wherein said second shaft is disposed in a fixed location in the vehicle fixed frame, wherein the second shaft is connected with a shifting gate on which the selector lever is disposed by way of the first shaft, and comprising a movable driving position selection member, wherein the selector lever has first and second engagement parts, said first engagement part being engageable with a third engagement part provided on the driving position selection member when said selector lever is in said first shifting channel.

5. Selecting device according to claim 4, wherein said shifting gate extends upwardly from said second shaft, wherein a lower section of the selection lever surrounds the shifting gate from above in a U-shape, and wherein the shifting gate has detents on its upper portion which are operably engageable with a locking device on the selection lever.

6. Selecting device according to claim 5, wherein the driving position selection member is a U-shaped control lever which is pivotally supported at the vehicle fixed frame to be pivotally movable about a transversely extending control lever pivot axis said control lever having a fourth engagement part which is engageable with the stifling gate to block pivotal movements of the control lever when the selector lever is in said second shifting channel.

7. Selecting device according to claim 6, wherein said control lever pivot axis is congruent with said first shaft when said selector lever is in said first shifting channel.

8. Selecting device according to claim 7, wherein the shifting gate has a stop face for limiting movement of the selection lever in the first shifting channel by interacting with the fourth engagement part of the control lever at a position of the selector lever where pivotal movement of the selector lever between the shifting channels can take place.

9. Selecting device according to claim 8, wherein the shifting gate has detent devices which, together with a corresponding detent device on the fixed frame, determine the position of the selector lever for each shifting channel in the transverse direction of the vehicle.

10. Selecting device according to claim 9, wherein the detent devices on the shifting gate are recesses, and the corresponding detent device on the frame is formed by an element with a rounded surface which is disposed on this frame while being loaded by a spring.

11. Selecting device according to claim 3, wherein the first and the second shaft are situated in the same plane.

12. Selecting device according to claim 4, wherein the first and the second shaft are situated in the plane.

13. Selecting device according to claim 7, wherein the first and the second shaft are situated in the same plane.

* * * * *